United States Patent
Guzenda (10) Patent No.: US 10,346,423 B2
(45) Date of Patent: Jul. 9, 2019

(54) MINIMIZING RESOURCE CONTENTION WHILE LOADING GRAPH STRUCTURES INTO A DISTRIBUTED DATABASE

(71) Applicant: Leon Guzenda, Rio Vista, CA (US)

(72) Inventor: Leon Guzenda, Rio Vista, CA (US)

(*) Notice: Subject to any disclaimer, the term of this patent is extended or adjusted under 35 U.S.C. 154(b) by 458 days.

(21) Appl. No.: 14/944,176

(22) Filed: Nov. 17, 2015

(65) Prior Publication Data

US 2017/0139986 A1    May 18, 2017

(51) Int. Cl.
*G06F 16/27* (2019.01)
*G06F 16/2455* (2019.01)
*G06F 7/08* (2006.01)
*G06F 15/16* (2006.01)

(52) U.S. Cl.
CPC ............ *G06F 16/27* (2019.01); *G06F 7/08* (2013.01); *G06F 16/24568* (2019.01)

(58) Field of Classification Search
CPC .............. G06F 7/08; G06F 17/30516; G06F 17/30575; G06F 16/24568; G06F 16/27
USPC ...................................................... 707/752
See application file for complete search history.

(56) References Cited

U.S. PATENT DOCUMENTS

| | | | |
|---|---|---|---|
| 5,504,885 A | 4/1996 | Alashqur | |
| 5,754,543 A | 5/1998 | Seid | |
| 5,893,108 A | 4/1999 | Srinivasan et al. | |
| 5,918,231 A * | 6/1999 | Yasumura | G06F 17/30607 707/999.003 |
| 5,926,463 A | 7/1999 | Ahearn et al. | |
| 6,003,036 A * | 12/1999 | Martin | G06F 17/30592 707/999.005 |
| 6,917,985 B2 | 7/2005 | Madruga et al. | |
| 6,961,310 B2 | 11/2005 | Cain | |
| 7,633,940 B1 | 12/2009 | Singh | |
| 7,739,402 B2 | 6/2010 | Roese | |
| 7,754,543 B2 | 7/2010 | Soda | |
| 7,860,895 B1 | 12/2010 | Scofield et al. | |
| 7,945,559 B2 | 5/2011 | Hays | |
| 8,117,187 B2 | 2/2012 | Mostl | |
| 8,160,056 B2 | 4/2012 | Van der Merwe | |
| 8,176,036 B2 | 5/2012 | Srivastava et al. | |
| 8,285,859 B2 | 10/2012 | Boldyrev et al. | |
| 8,543,681 B2 | 9/2013 | Bearden et al. | |
| 8,560,671 B1 | 10/2013 | Yahalom et al. | |

(Continued)

*Primary Examiner* — Usmaan Saeed
*Assistant Examiner* — Brian E. Weinrich
(74) *Attorney, Agent, or Firm* — Patrick Reilly (57) ABSTRACT

Presented is a method by which large amounts of data may be sorted and downloaded. In the presented invention, two keys are selected which may be associated with all records in a designated distributed, relational, object-oriented, graph or other database, and the records are sorted first by means of the first and second keys to generate a first file, and subsequently by means of the second and first keys to generate a second file. It is determined which of the resultant files contains a larger number of groups, and the file containing the larger number of groups is selected for loading, preferably by means of a plurality of data load streams. Further presented is means by which the data load streams may be executed in parallel with one another while minimizing contention for shared resources. The method additionally helps to increase the amount of parallelism that may be deployed in support of database search operations.

22 Claims, 10 Drawing Sheets

(56) References Cited

U.S. PATENT DOCUMENTS

| | | | |
|---|---|---|---|
| 8,626,749 B1* | 1/2014 | Trepetin | G06F 21/6227 707/722 |
| 9,021,113 B2 | 4/2015 | Carr et al. | |
| 2002/0042274 A1 | 4/2002 | Ades | |
| 2003/0086425 A1 | 5/2003 | Bearden et al. | |
| 2003/0130821 A1 | 7/2003 | Anslow et al. | |
| 2003/0224384 A1 | 12/2003 | Sayood | |
| 2004/0017783 A1 | 1/2004 | Szentesi | |
| 2004/0024573 A1 | 2/2004 | Allen et al. | |
| 2004/0143678 A1 | 7/2004 | Chari et al. | |
| 2006/0149712 A1 | 7/2006 | Kindsvogel et al. | |
| 2006/0182034 A1 | 8/2006 | Klinker et al. | |
| 2006/0287981 A1 | 12/2006 | Meyers et al. | |
| 2007/0058631 A1 | 3/2007 | Mortier et al. | |
| 2007/0106666 A1* | 5/2007 | Beckerle | G06F 17/30575 707/999.007 |
| 2008/0209046 A1 | 8/2008 | Karkanias et al. | |
| 2009/0292814 A1 | 11/2009 | Ting et al. | |
| 2010/0223240 A1* | 9/2010 | Cooper | G06F 17/30321 707/696 |
| 2011/0035673 A1 | 2/2011 | Chou et al. | |
| 2011/0078188 A1 | 3/2011 | Li et al. | |
| 2011/0191200 A1 | 8/2011 | Bayer et al. | |
| 2012/0197834 A1 | 8/2012 | Panigrahy et al. | |
| 2012/0227086 A1 | 9/2012 | Dale et al. | |
| 2013/0110766 A1* | 5/2013 | Promhouse | G06F 17/30377 707/607 |
| 2013/0226971 A1* | 8/2013 | Shoolman | G06F 17/30575 707/790 |
| 2013/0238815 A1 | 9/2013 | Ogawa et al. | |
| 2013/0282806 A1 | 10/2013 | Steinberg et al. | |
| 2013/0318228 A1 | 11/2013 | Raja et al. | |
| 2013/0325847 A1 | 12/2013 | Suchter et al. | |
| 2014/0074893 A1 | 3/2014 | Griffin | |
| 2014/0122585 A1 | 5/2014 | DeLong | |
| 2016/0171055 A1* | 6/2016 | Erickson | G06F 17/30424 707/723 |

* cited by examiner

MINIMIZING RESOURCE CONTENTION WHILE LOADING GRAPH STRUCTURES INTO A DISTRIBUTED DATABASE

FIELD OF THE INVENTION

The present invention relates to information technology systems and architectures for database loading and searching. More particularly, the present invention relates to dynamic database management system architectures wherein the distribution of linked records within a system is arranged or altered.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Information technology systems that store data and enable searching thereof are widely available in all economic sectors. Many systems have high volumes of data, wherein potentially terabytes of data must be searched within milliseconds or microseconds. In large database systems, to include distributed database systems, the arrangement of data within a plurality of resources can be a determination of the effectiveness of high-volume and broad searching.

The prior art, however, fails to optimally, dynamically configure information technology systems or networks that adapt and distribute data among resources to enable rapid searching of large amounts of data, to include terabytes and more. Means to distribute and load volumes of data among a plurality of storage resources in a method that significantly improves likelihood of distributed the data more evenly about the data storage resources are currently non-optimal in the prior art.

There is therefore a long-felt need to provide a system and method for the configuration of distributed data of systems or networks among resources to allow rapid loading and searching of large amounts of data.

OBJECTS OF THE INVENTION

It is an object of the method of the present invention to provide a novel and non-obvious ability to distribute and load volumes of data among a plurality of storage resources in a method that significantly improves likelihood of distributing the data more evenly about the data storage resources and thereby better improving the operation of an information technology system or database management network by better solving the technological challenge of efficiently storing different collections of data of many varieties.

It is an additional object of the method of the present invention to better solve the technological problem of information technology systems in the challenges of applying resources in distributing data to better enable efficient searching of the storage of data.

It is an additional and optional object of the method of the present invention to enable information systems and information technology networks to better solve the technological problems of efficiently storing of large volumes of rapidly acquired data, e.g., receiving terabytes or more of data received generated within seconds of time, and to enable efficient searching of these large volumes of data as have been efficiently and distributively stored in accordance with the method of the present invention.

SUMMARY OF THE INVENTION

Towards these objects and other objects that will be made obvious in light of the present disclosure a process is presented by which a database may contain an extremely large number of linked data records, and by which a first and second key are selected by a computer processor, and both the first key and the second key may be associated with any plurality of data records within the database. The database may use any database technology known in the art, including but not limited to, graph, object-oriented, relational, key-value, column store, structured query language ("SQL"), not only structured query language ("NoSQL"), or document database management system (hereinafter "DBMS"). The DBMS may be centralized or distributed. The database technology type is largely immaterial to the effective functioning of the invention, and thus may be or comprise any suitable current or future database technology known in the art. The first key and/or the second key may optionally, but are not limited to, be an element directly taken from the data record (e.g. the final two digits of a plurality of phone numbers), or may optionally be an algorithmically generated hash of an element of the data record, or of the entirety of the data record.

In the preferred embodiment of the invention, the processor may subsequently sort the plurality of records using the first key to generate a first intermediate resultant file, i.e. sorting the plurality of records in order by the first key as a major key and the second key as a minor key to generate a first candidate file. The processor may count the number of "groups" of records corresponding to the key pairs within the first candidate file. The processor may subsequently sort the same plurality of records by the second key as the major key and the first key as the minor key to generate a second candidate file and count the number of groups of records corresponding to the key pairs within the second candidate file. The processor, determining the candidate file having the greater number of groups, chooses the candidate file having the greater number of groups, and loads the candidate file into the receiving database of a database management system ("DBMS"), wherein the DBMS is capable of searching the designated file upon receipt. It is not necessary that the data records be homogenous, but each data record must preferably have similar data elements such that the first key and the second key may be applied thereto.

It is understood that in certain alternate preferred embodiments of the method of the present invention that a key group comprising three or more keys selected from a plurality of software records may be formed and applied to designate a plurality of resources and/or to selectively associate software records of the plurality of software records with the plurality resources for the purpose of selectively distributing and loading the plurality of software records into the plurality of resources.

The resources to which the output files may be assigned may optionally be a plurality of physically separate computing systems, or may optionally be one or more DBMS systems made available by a designated receiving database. Keys are mapped to corresponding resources, whereby the resources are designed to receive the keys to which the resources correspond, and to create a sorted, easily searchable store of the keys. The speed and efficiency with which the data load resources are supplied with keys and/or key pairs are preferably restricted only by the physical limitations of the computing power of the receiving database, rather than by technological or methodological means—in other words, given that the software operations are ultimately occurring on a physical medium, the limitations of physical media apply. The hosting resource, or the DBMS resource hosted by a computing system, however, is made more efficient by the application of resources toward the distribution of data, such that the data is distributed more evenly about data storage resources.

In a further aspect of the preferred embodiment of the invention, the computer processor or a human may determine an arbitrary, fixed number of output files to be generated, and a number of records to be assigned to each output file. The computer processor may further preferably assign a substantively equal number of groups to each of the arbitrary, fixed number of output files, and may subsequently upload the designated number of output files to the DBMS in a parallel manner.

In a yet further aspect of the preferred embodiment of the invention, the candidate file is preferably split into at least two, but optionally more than two, output files, and each group is included in exactly one output file, without being split or divided. The two or more output files may subsequently be loaded in a parallel state to the DBMS, according to a plurality of unique key pairs associated with unique records within the output files. A list of all possible key pairs among the first key and the second key is preferably generated, and records having the same key as either component (key) of a key pair are preferably not uploaded in parallel to one another when they are contained within different output files.

Despite trying to achieve an even spread of groups of data to be loaded in parallel, it is possible that some groups could be larger than others. This may cause one or more streams to hold shared resources for longer than an average time. An enhanced stream key list algorithm may mitigate this problem by (1) retaining a frequency count for each key pair; and (2) checking the size of each batch inserted into the load files during a pass across each of the data load streams and adding one or more batches to data load streams that are likely to finish processing a batch before others.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which.

DETAILED DESCRIPTION

Figure 1:
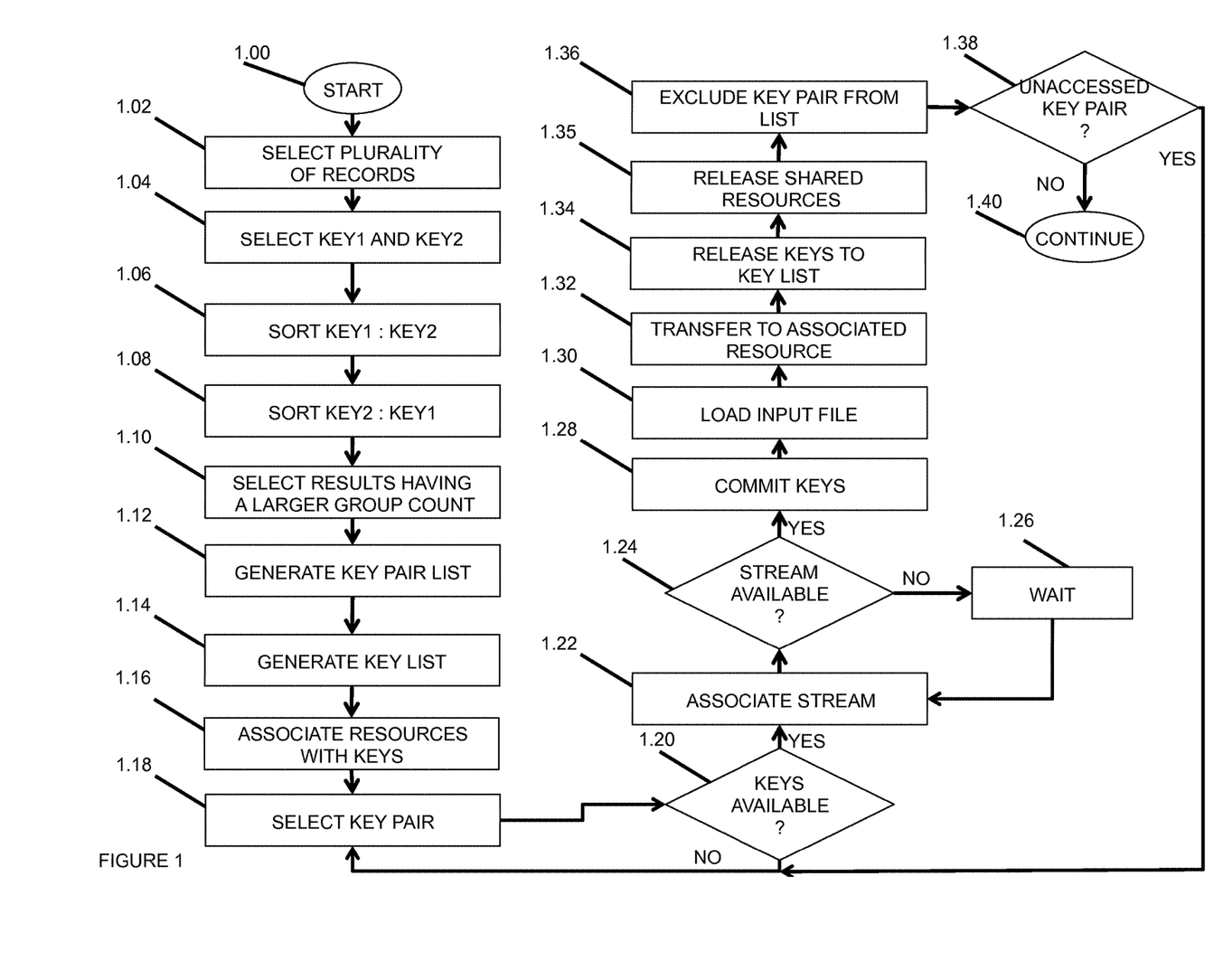
FIG. 1 is a flowchart of an aspect of the invented method, wherein a processor of a computing system selects, orders and loads a plurality of keys by means of one or more data load streams.

Referring now generally to the Figures and particularly to FIG. 1, FIG. 1 is a flowchart of an aspect of the invention whereby a processor 2 of a computing system 4 directs the computing system 4 to select, order and load a plurality of keys KEY.001-KEY.N to access a plurality of data records REC.001-REC.N by means of one or more data load streams 6. In step 1.02 the processor 2 selects a plurality of data records REC.001-REC.N from a data load stream 6, input file 8 or a database 10, which database 10 may use any database maintenance technology known in the art, including but not limited to, graph, object-oriented, relational, key-value, column store, structured query language ("SQL"), not only structured query language ("NoSQL"), or document database management system (hereinafter "DBMS"). The DBMS may be centralized or distributed. The particular database technology type chosen for application of the method of the invention is largely immaterial to the effective functioning of the method of the invention, and thus may be or comprise any suitable current or future database maintenance technology known in the art. The data records REC.001-REC.N may optionally be homogenous, but homogeneity is not necessary for the functioning of the invention; the data records REC.001-REC.N need only have similar enough data elements 12 such that a first key KEY1 and a second key KEY2 may be utilized.

In step 1.04 the processor 2 selects the data elements 12 for incorporation into the first key KEY1 and the second key KEY2, and determines how to generate the first key KEY1 and the second key KEY2. The first key KEY1 and the second key KEY2 may optionally be selected as direct elements of the data records REC.001-REC.N, for example as the last two numbers of a telephone number, or the first key KEY1 and the second key KEY2 may optionally be an algorithmically determined hash of a data element of the data records REC.001-REC.N by any convenient algorithm that preserves uniqueness. Additionally, a plurality of different data records REC.001-REC.N may optionally generate an identical first key KEY1 and/or second key KEY2, as in the telephone number example: thousands of phone numbers may share the identical terminating digits, but may otherwise be distinct.

In step 1.06 the processor 2 sorts the selected plurality of data records REC.001-REC.N by the first key KEY1 as a major key and the second key KEY2 as a minor key, generating a first candidate file 14A. The processor 2 may additionally count the number of "groups" 16 of data records REC.001-REC.N generated within the first candidate file 14A by the sorting of the first key KEY1 through the second key KEY2. In step 1.08, the processor 2 sorts the selected plurality of data records REC.001-REC.N by the second key KEY2 as the major key and the first key KEY1 as the minor key, generating a second candidate file 14B. The processor 2 may additionally count the number of "groups" 16 of data records REC.001-REC.N generated within the second candidate file 14B by the sorting of the second key KEY2 through the first key KEY1. The two separate sorting processes preferably generate differing numbers of groups 16 within the first candidate file 14A and the second candidate file 14B, and the processor 2 in step 1.10 selects the candidate file 16A or 16B having the greater number of groups 16 therein. The greater number of groups 16 allows for greater evenness of groups 16 among a plurality of data load streams 6.

In step 1.12 the processor 2 generates a key pair list 18 from the selected candidate file 16A or 16B (hereinafter "selected file 16A or 16B"), wherein the key pair list 18 contains every detected combination of the first key KEY1 and the second key KEY2. In step 1.14 the processor 2 generates a key list 20, wherein the key list 20 contains every one of the first key KEY1 and of the second key KEY2 generated from the data records REC.001-REC.N. In step 1.16 the plurality of first keys KEY1 and second keys KEY2 are associated with access and loading of resources 0001-N on a many-to-one basis, such that each of the plurality of first keys KEY1 and second keys KEY2 corresponds with a single access and loading of resources 0001-N. The loading of resources 0001-N may optionally be physically separate computing devices, or may optionally be one or more DBMS systems within a single computing device. The speed and power of loading of resources 0001-N are limited only by the capabilities of the computing devices on which they function. The allocation of the plurality of first keys KEY1 and the plurality of second keys KEY2 is important for at least two reasons: first, the access and loading of resources 0001-N is potentially shareable among users, and thus the goal of the allocation process is to only allow one user to write to the data and loading of resources 0001-N at a time, minimizing bottlenecks; second, distributing the data to known places increases the efficiency of parallel search operations.

It is understood that in certain alternate preferred embodiments of the method of the present invention that a key group comprising three or more keys KEY1-KEYN may be formed and applied to designate individual of resources 0001-N of the plurality of resources 0001-N and/or to selectively associate the plurality of records REC.001-REC.N with the plurality resources 0001-N for the purpose of selectively distributing and loading the plurality of records REC.001-rec.N into the plurality of resources 0001-N.

In step 1.18 the processor 2 selects a key pair 24 from the list of key pairs 24 generated above. In step 1.20 the processor 2 determines whether the keys KEY.001-KEY.N in the selected key pair 24 are available. To determine availability, the processor 2 determines whether one or both of the keys KEY.001-KEY.N in the selected key pair 24 are already being allocated to another access or loading process 6 (also represented herein as a "stream 6"). When the processor 2 determines in step 1.20 that the keys KEY.001-KEY.N in the selected key pair 24 are not available, the processor 2 returns to step 1.18, wherein the processor 2 selects an alternative key pair 24, and repeats steps 1.18 through 1.20 until it is determined that the selected keys KEY.001-KEY.N are available. When it is determined in step 1.20 that the keys KEY.001-KEY.N in the selected key pair 24 are available, the processor 2 associates the selected key pair 24 to a data load stream 6. In step 1.24 the processor 2 determines whether the data load stream 6 is available, i.e. that the data load stream 6 is not already associated to a maximum number of key pairs 24. When the processor 2 determines that the data load stream 6 is unavailable, the processor 2 proceeds to step 1.26, wherein the processor 2 waits for the data load stream 6 to become available. The processor 2 subsequently proceeds to step 1.22, and associates the selected key pair 24 to the data load stream 6. Alternately, when the processor 2 determines in step 1.24 that the data load stream 6 is available, the processor 2 proceeds to step 1.28, wherein the processor 2 commits the key pair 24 to the available data load stream 6. A committed key pair 24 cannot be accessed for the duration of the key pair's 24 load process. One or more keys KEY.001-KEY.N may be indicated to be committed to a key pair 24 load process by the triggering within the one or more keys KEY.001-KEY.N a "committed" flag FLAG.CMT.001-FLAG.CMT.N.

In step 1.30 the processor 2 loads an input file 8 from the committed keys KEY.001-KEY.N. In step 1.32 the input file 8 is transferred to an associated computing resource 0001-N. The processor 2 releases the keys KEY.001-KEY.N back to the key list 20, wherein the released keys KEY.001-KEY.N on the key list 20 may be used for alternate load processes in alternate key pairs 24 in step 1.34. When the keys KEY.001-KEY.N are released to the key list 20, an "available" flag FLAG.AVAIL.001-FLAG.AVAIL.N is triggered within the one or more keys KEY.001-KEY.N, indicating that the keys KEY.001-KEY.N are available to be paired and used. In step 1.35 any shared resource 0001-N which has been obtained for exclusive write/update usage at the start of the loading of a new batch of key pair 24 records REC.001-REC.N is released at the end of loading that batch of key pair 24 records REC.001-REC.N. In step 1.36 the key pair 24 is excluded from the key pair list 18, as it is no longer necessary to access that particular key pair 24.

The invention is intended for use, but is not limited to use, in highly parallel environments, such as Apache Hadoop MapReduce, authored by Apache Software Foundation of Delaware, US, or Apache Spark, authored by Apache Software Foundation of Delaware, US. The invention may be used for batches of "Big Data" (as defined below) or for micro-batches of "Fast Data" (as defined below). Although the invention is most effective when applied to the loading of graph, or network, data, it could also be applied in any situation where clustering of data or use of a computing resource could overload a particular device, such as a disk drive, communications switch, or Central Processing Unit (CPU).

"Big Data" is a broad term for data sets so large or complex that traditional data processing applications are inadequate. The challenges facing those who work with Big Data are analysis, capture, data curation, search, sharing, storage, transfer, visualization, and information privacy.

"Fast Data" is a term coined by the computer/social science expert John Furrier. Fast Data is a "cousin" of Big Data and implies the ability to make near real-time decisions and enable orders of magnitude improvements in elapsed time to decisions for businesses.

In step 1.38 the processor 2 determines whether a key pair 24 remains which has not yet been accessed. When the processor 2 determines in step 1.38 that one or more additional key pairs 24 remain unaccessed, the processor 2 returns to step 1.18, selects a new key pair 24, and executes the loop of steps 1.18 through 1.38 until it is determined in step 1.38 that no key pairs 24 remain. When the processor 2 determines that no key pairs 24 remain, the processor 2 proceeds to step 1.40, wherein the processor 2 continues to alternate operations.

Figure 2:
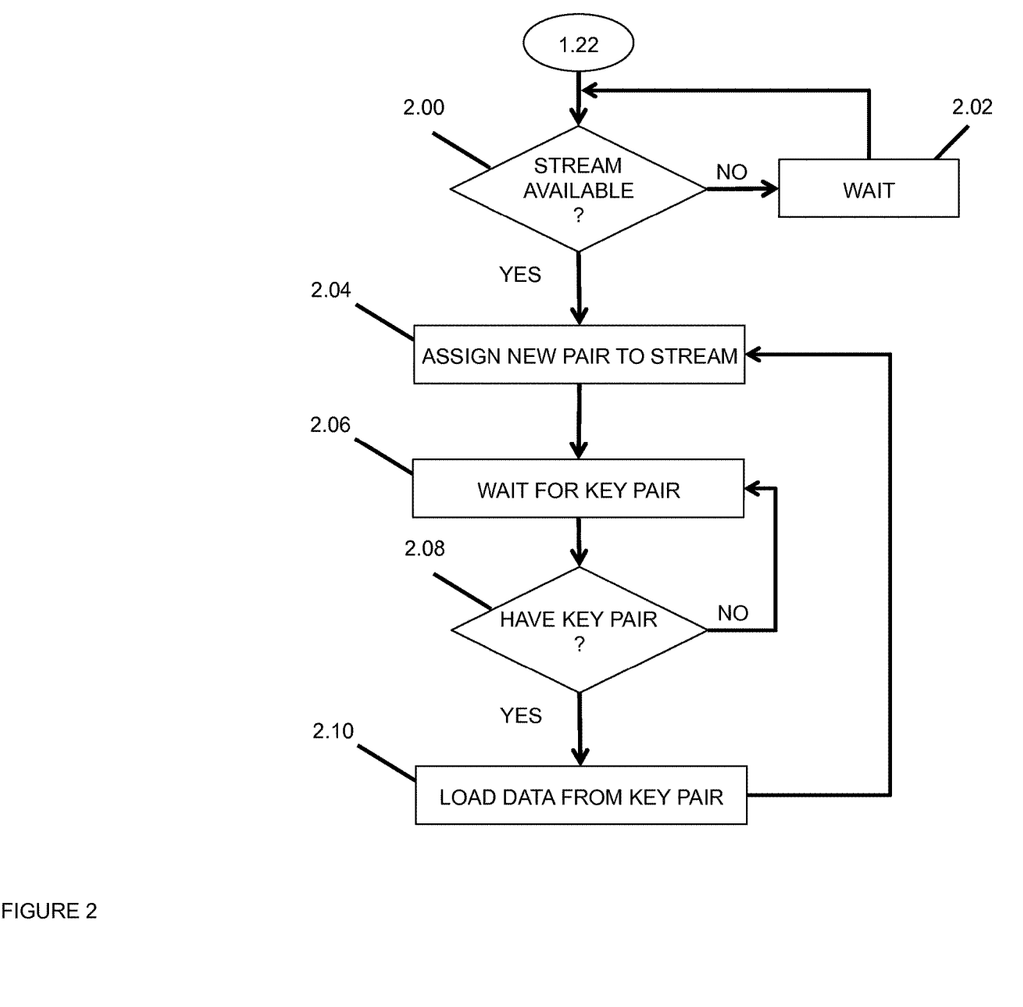
FIG. 2 is a flowchart of an additional aspect of the invented method, wherein a plurality of key pairs are loaded in parallel processes.

Referring now generally to the Figures, and particularly to FIG. 2, FIG. 2 is flowchart of an additional aspect of the invention, wherein data records REC.001-REC.N are loaded to the database 10 in parallel processes. The processor 2 proceeds from step 1.22 of the method of FIG. 1, and determines in step 2.00 whether a download stream is available. When the processor 2 determines that a download stream is not available, the processor 2 waits for the stream to become available in step 2.02, and subsequently returns to step 2.00 and determines whether the download stream is available. When the processor 2 determines in step 2.00 that the download stream is available, the processor 2 assigns a new key pair to the download stream in step 2.04. In step 2.06 the download stream waits for the key pair 24. In step 2.08, it is determined whether the download stream has accessed the key pair 24. When it is determined that the download stream has not accessed the key pair 24, the download stream continues to wait for the key pair 24 in step 2.06. When it is determined that the download stream has accessed the key pair 24 in step 2.08, the data is loaded from the key pair 24 in step 2.10. Steps 2.04 through 2.10 are subsequently repeated as necessary.

Figure 3:
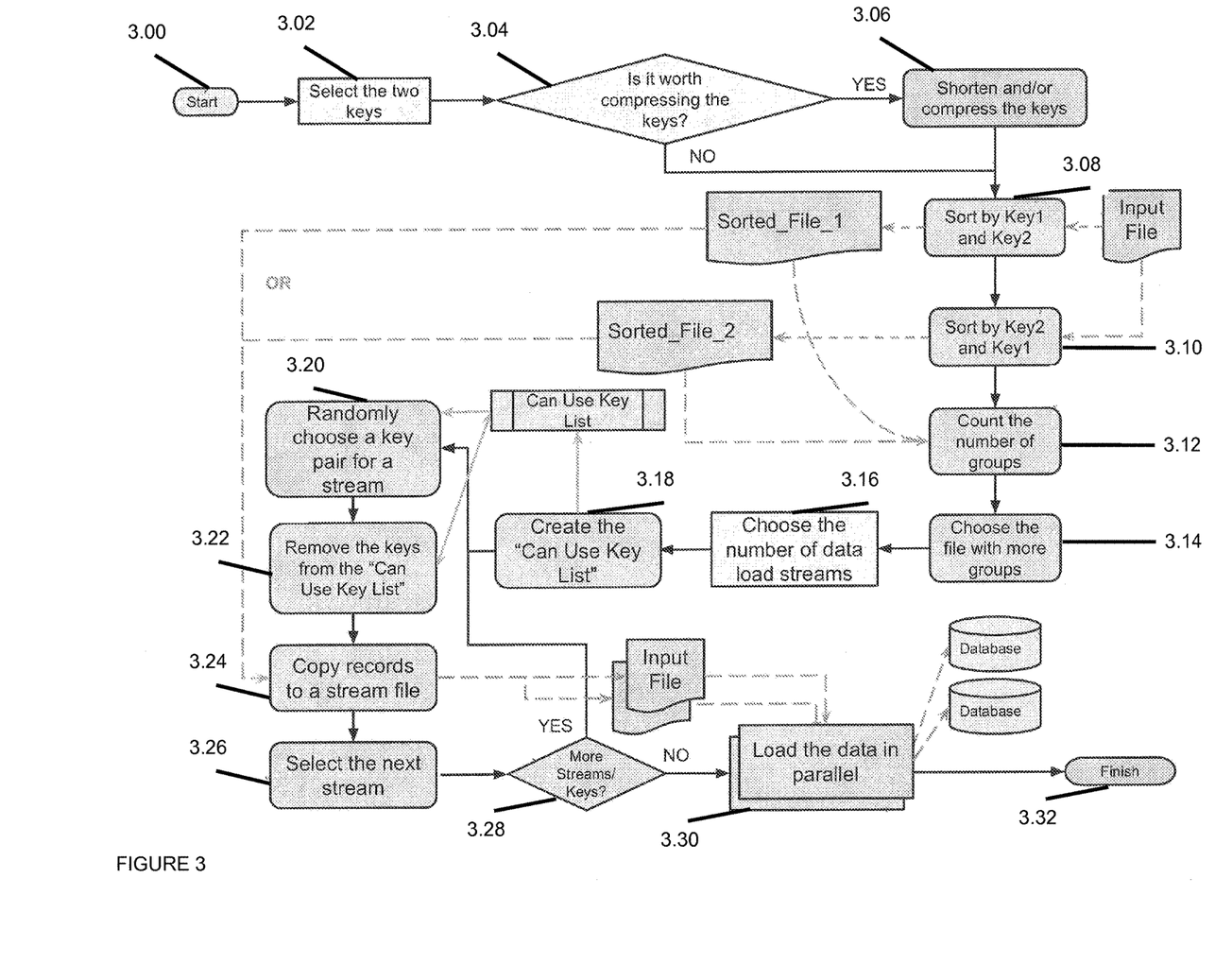
FIG. 3 is a flowchart of a further aspect of the invented method, wherein the computing system sorts keys, assigns non-conflicting key pairs to one or more data load streams, and loads data in parallel.

Referring now generally to the Figures, and particularly to FIG. 3, FIG. 3 is a flowchart of a further aspect of the invented method, wherein the processor 2 sorts keys KEY.001-KEY.N, assigns key pairs 24 to one or more data load streams 6, and loads data records REC.001-REC.N in parallel. In step 3.02 the processor 2 selects the first key KEY1 and the second key KEY2 from the data elements 12 of the data records REC.001-REC.N. In step 3.04 the processor 2, or a user, determines whether it is necessary to shorten or compress the first key KEY1 and the second key KEY2. The primary criteria by which the need for compression or shortening may be judged are (a.) the overall length of the data element of the data record; and (b.) the nature of the data element of the data record—whether it is alphanumeric, or contains other symbols which may interrupt the load processes. When the processor 2 determines that it is necessary for the first key KEY1 and the second key KEY2 to be compressed, hashed, or shortened, the processor 2 proceeds to step 3.06, wherein the first key KEY1 and the second key KEY2 are compressed, hashed, or shortened as necessary. When it is determined that the first key KEY1 and the second key KEY2 do not need to be shortened, compressed, or hashed, the processor 2 advances to step 3.08, wherein the data records REC.001-REC.N are sorted first by the first key KEY1 as major key and by the second key KEY2 as the minor key, generating a first candidate file 14A, containing a plurality of groups 16 of data records REC.001-REC.N. In step 3.10 the data records REC.001-REC.N are sorted first by the second key KEY2 as the major key and by the first key KEY1, as the minor key, generating a second candidate file 14B, containing a second plurality of groups 16 of data records REC.001-REC.N. The number of groups 16 of data records REC.001-REC.N contained within the first candidate file 14A and the second candidate file 14B are compared in step 3.14, and the candidate file containing the greater number of groups 16 of data records REC.001-REC.N is selected.

In step 3.16 the total number of data load streams 6 to use in the data load process is chosen either by the processor 2 or by a user. The number of data load streams 6 may be limited by processing power of a designated computing system 4, or by any other data limiting method known in the art. In step 3.18 the processor 2 creates a "can-use key list," 26 composed of all of the keys KEY.001-KEY.N in the set of data records REC.001-REC.N, without allowing for repetition of keys KEY.001-KEY.N. In step 3.20 a key pair 24 is randomly designated from the keys KEY.001-KEY.N in the can-use key list 26, and designated for a specific data load stream 6. In step 3.22 the processor 2 removes the keys KEY.001-KEY.N composing the newly created key pair 24 from the can-use key list 26, granting exclusive access to the keys KEY.001-KEY.N in the key pair 24 to the data load stream 6 in which the key pair 24 has been placed. The keys KEY.001-KEY.N comprising the key pair 24 may be indicated to be committed to a load process by the triggering within the designated keys KEY.001-KEY.N a "committed" flag FLAG.CMT.001-FLAG.CMT.N.

In step 3.24 the data records REC.001-REC.N associated with the key pair 24 in the data load stream 6 are placed into a stream file 28. A next data load stream 6 is selected in step 3.26. In step 3.28 the processor 2 determines whether more data load streams 6 and/or keys KEY.001-KEY.N and key pairs 24 are available for access. When the processor 2 determines in step 3.28 that more data load streams 6 and/or keys KEY.001-KEY.N and key pairs 24 are available for access, the processor 2 returns to step 3.20 and repeats the loop of steps 3.20 through 3.28 until it is determined in step 3.28 that no more data load streams 6 and/or keys KEY.001-KEY.N and key pairs 24 are available for access. When the processor 2 determines that no more data load streams 6 and/or keys KEY.001-KEY.N and key pairs 24 are available, the processor 2 proceeds to step 3.30, wherein the data records REC.001-REC.N are loaded in parallel processes. In step 3.32, the processor 2 terminates the process.

Figure 4:
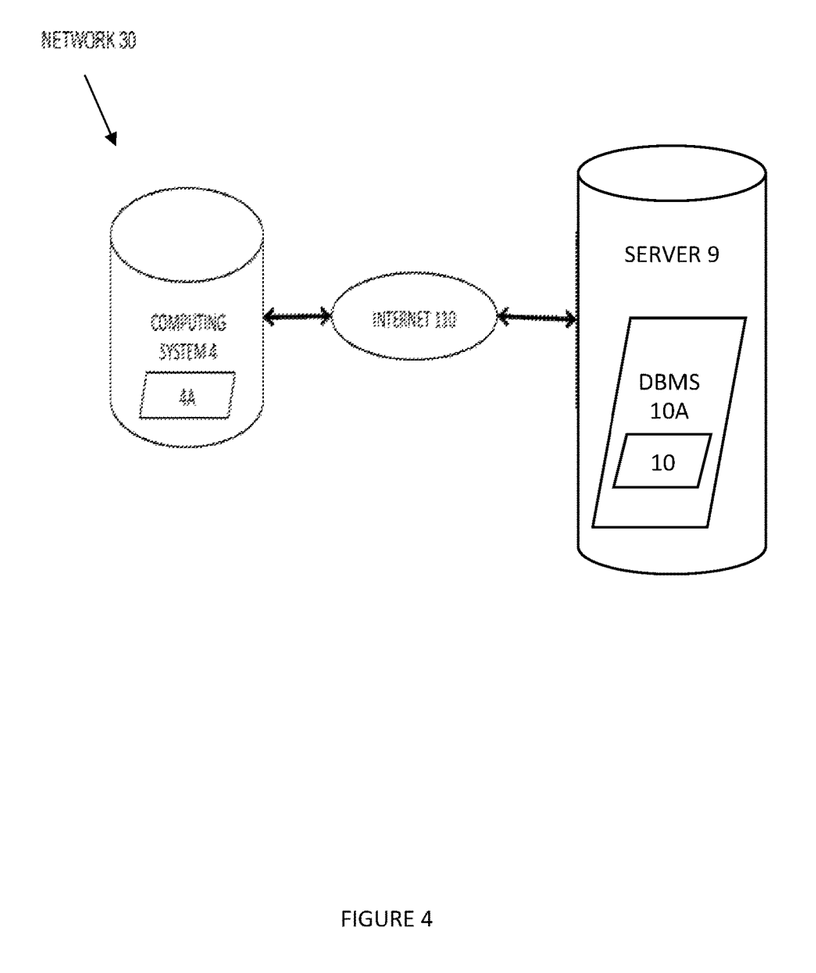
FIG. 4 is a block diagram of a communications network, wherein the network includes a computing system, and a server hosting a database bidirectionally and communicatively coupled by means of one or more network coupling means known in the art, including but not limited to the Internet.

Referring now generally to the Figures and particularly to FIG. 4, FIG. 4 is a block diagram of an electronic communications network 30 (hereinafter "the network 30"), wherein the network includes the computing system 4, and a server 9 bidirectionally and communicatively coupled by means of one or more network coupling means known in the art, including but not limited to the Internet. The computing system 4 and the server 9 each preferably comprise or are bi-directionally communicatively coupled with a separate database management system software, respectively a computing system DBMS 4A and a DBMS 10A which includes one or more databases 10.

The computing system DBMS 4A and/or the DBMS 10A may be or comprise a graph database management system, an object-oriented database management system ("OODBMS") and/or a relational database management system ("RDBMS"), and one or more databases DBS 4I and/or DBS 10I, may be or comprise a graph database, an object-oriented database and/or a relational database. More particularly, the computing system DBMS 4A and/or the DBMS 10A may be, may be comprised within, or may comprise one or more prior art database management systems including, but not limited to, an OBJECTIVITY/DB™ object-oriented database management system marketed by Objectivity, Inc. of San Jose, Calif., an INFINTEGRAPH™ graph database management system marketed by Objectivity, Inc. of San Jose, Calif., an ORACLE DATABASE™ database management system marketed by Oracle Corporation, of Redwood City, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; and the POSTGRESQL™ open source object-relational database management system, or other suitable database management system or systems known in the art.

The server 9 hosting the database 10 may bi-directionally communicate and transfer data with the computing system 4 via the network 30 by suitable electronic communications messaging protocols and methods known in the art including, but not limited to, Simple Object Access Protocol, Representational State Transfer, and/or a web service adapted to conform with the architecture and structure of the World Wide Web.

It is understood that the computing system 4 comprises a computing system software program SW.CMP comprised within, hosted by and/or enabled by a bundled computer software and hardware product such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling electronic communications and database management operations known in the art.

It is understood that the server 9 hosting the database 10 additionally comprises a database system software program SWDB comprised within, and that the server 9 may be a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling electronic communications and database management operations known in the art.

Figure 5:
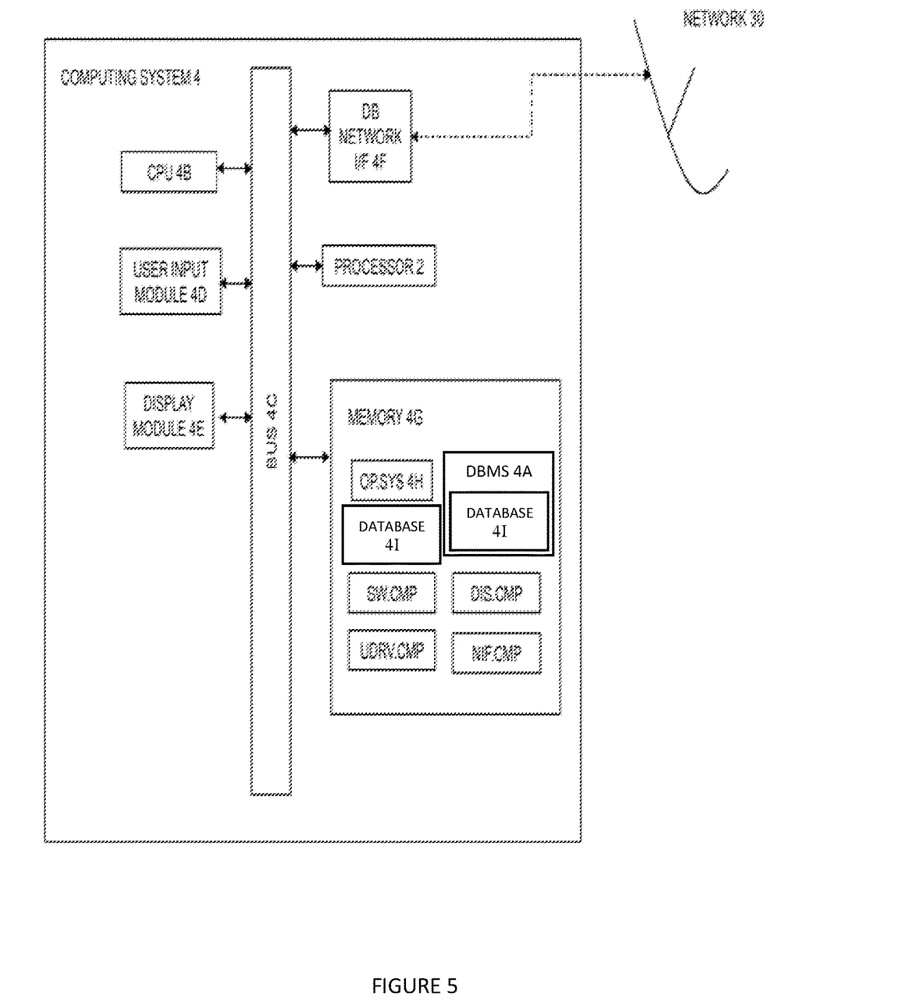
FIG. 5 is a block diagram of the computing system of FIG. 4.

Referring now generally to the Figures, and particularly to FIG. 5, FIG. 5 is a block diagram of the computing system 4 of FIG. 4, wherein the computing system 4 may comprise: a central processing unit ("CPU") 4B; a user input module 4D; a display module 4E; a software bus 4C bi-directionally communicatively coupled with the CPU 4B, the user input module 4D, the display module 4E; the software bus 4C is further bi-directionally coupled with a network interface 4F, enabling communication with alternate computing devices by means of the network 30; and a memory 4G. The computing system software bus 4C facilitates communications between the above-mentioned components of the computing system 4.

The memory 4G of the computing system 4 includes a computing system software operating system OP.SYS 4H. The computing system 4 software OP.SYS 4H of the computing system 4 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The computing system memory 4G further includes the computing system software program SW.CMP, a computing system user input driver UDRV.CMP, a computing system display driver DIS.CMP, and a computing system network interface drive NIF.CMP.

The exemplary computing system software program SW.CMP is optionally adapted to enable the computing system 4 to manage the computing system DBMS 4A to perform, execute and instantiate all elements, aspects and steps as required of the computing system 4 to practice the invented method in its various preferred embodiments interaction with the database 10.

Figure 6:
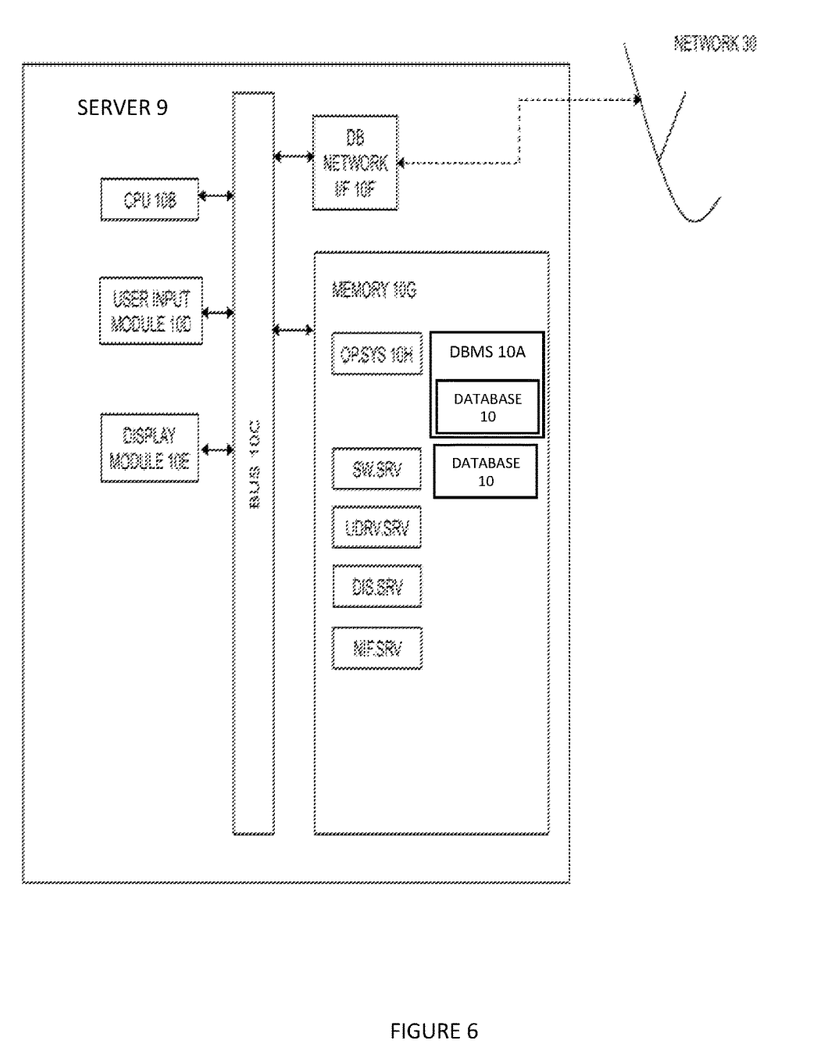
FIG. 6 is a block diagram of the server hosting the database of FIG. 4.

Referring now generally to the Figures, and particularly to FIG. 6, FIG. 6 is a block diagram of the server 9 of FIG. 4, wherein the server 9 may comprise: a central processing unit ("CPU") 10B; a user input module 10D; a display module 10E; a software bus 10C bi-directionally communicatively coupled with the CPU 10B, the user input module 10D, the display module 10E; the software bus 10C is further bi-directionally coupled with a network interface 10F, enabling communication with alternate computing devices by means of the network 30; and a memory 10G. The server software bus 10C facilitates communications between the above-mentioned components of the server.

The memory 10G of the server includes a server software operating system OP.SYS 10H. The server software OP.SYS 10H of the server may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The server memory 10G further includes the server software program SW.SRV, a server user input driver UDRV.SRV, a server display driver DIS.SRV, and a server network interface drive NIF.SRV.

The exemplary server software program SW.SRV is optionally adapted to enable the server to manage the server DBMS 10A to perform, execute and instantiate all elements, aspects and steps as required of the server to practice the invented method in its various preferred embodiments interaction with the database 10.

Figure 7A:
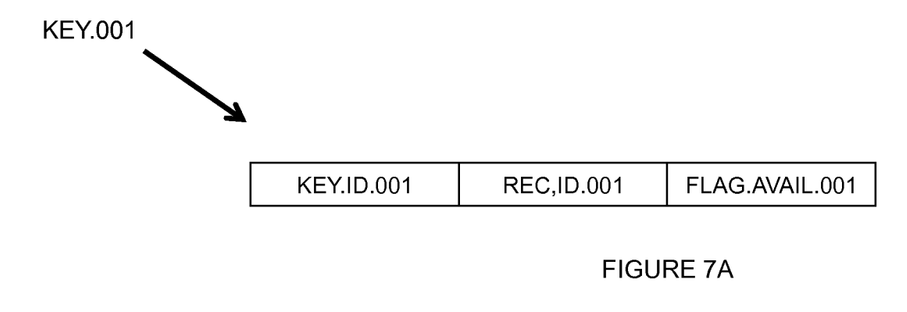
FIG. 7A is a block diagram of an exemplary first key having a flag indicating the key's availability

Referring now generally to the Figures, and particularly to FIG. 7A, FIG. 7A is a block diagram of a first exemplary software key KEY.001 when the exemplary first key KEY.001 is displaying a flag FLAG.AVAIL.001 indicating the availability of the first key KEY.001. The first key KEY.001 further includes a key identifier KEY.ID.001, by which the first key KEY.001 may be identified within a key list 20, and by the processor 2 of the computing system 4, and by the database 10; and a record identifier REC.ID.001, by which the data record REC.001 that the first key KEY.001 represents may be identified.

Figure 7B:
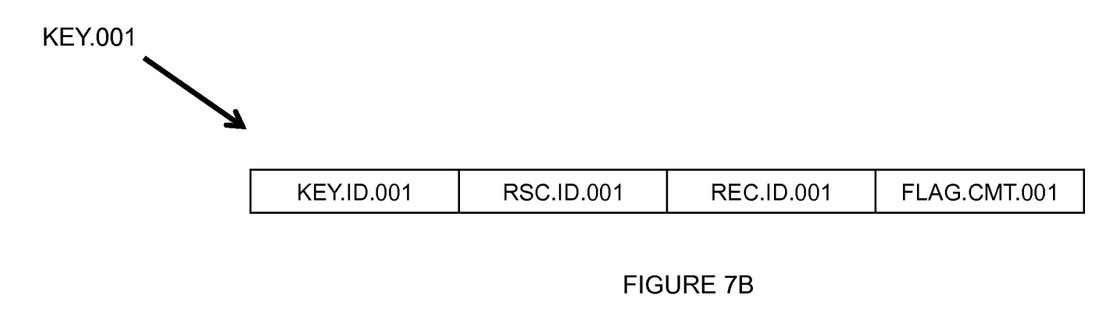
FIG. 7B is a block diagram of the exemplary first key having a flag indicating that the key is committed to a resource.

Referring now generally to the Figures, and particularly to FIG. 7B, FIG. 7B is a block diagram of a first exemplary software key KEY.001 when the exemplary first key KEY.001 is displaying a flag FLAG.CMT.001 indicating that first key KEY.001 has been committed to a loading of at least one resource 0001-N. The first key KEY.001 further includes a key identifier KEY.ID.001, by which the first key KEY.001 may be identified within a key list 20, and by the processor 2 of the computing system 4, and by the database 10; a record identifier REC.ID.001, by which the data record REC.001 that the first key KEY.001 represents may be identified; and a resource identifier RSC.ID.001 by which the loading of one or more resources 0001-N to which the key has been committed may be identified.

Figure 8A:
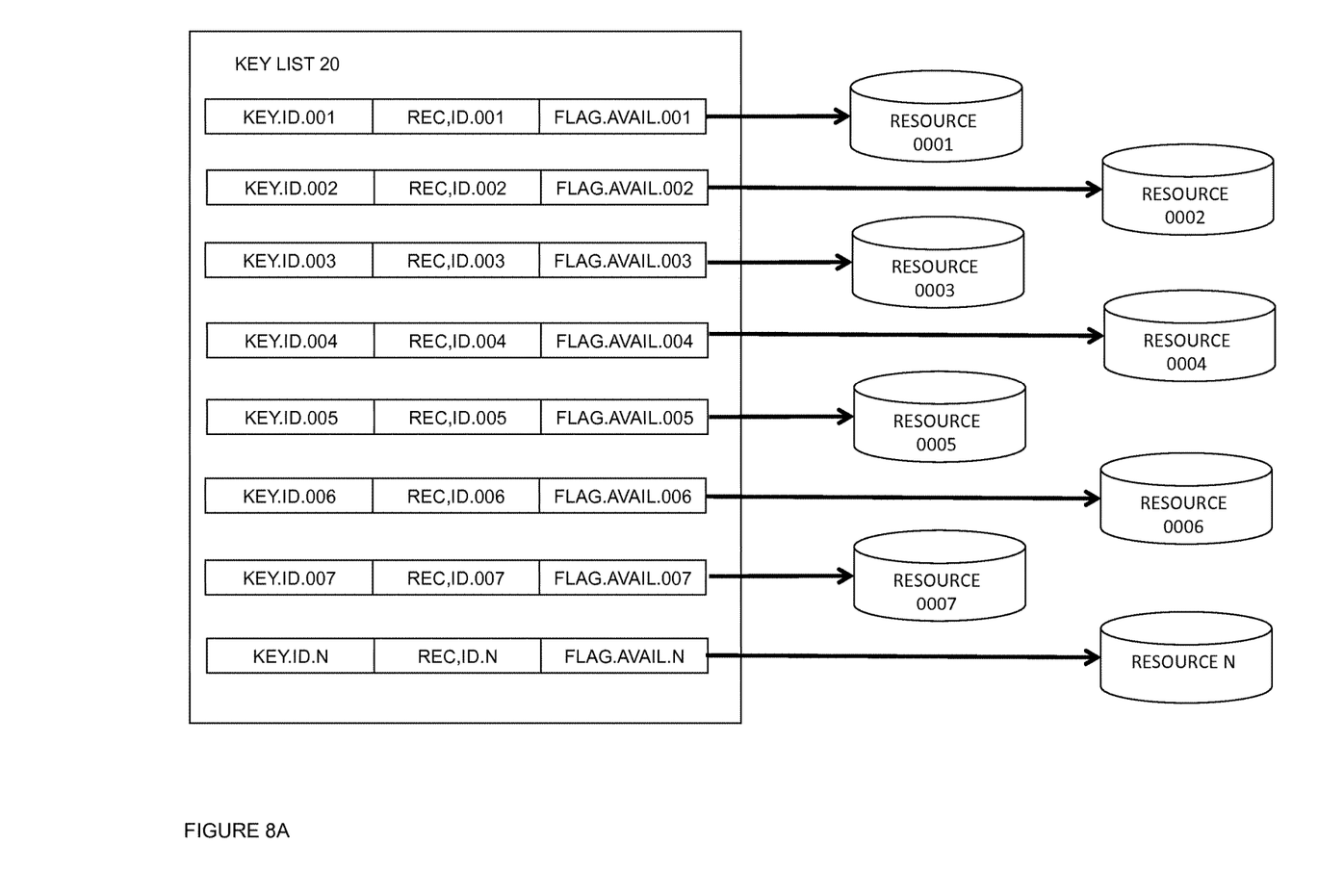
FIG. 8A is a block diagram of a key list, wherein the key list contains keys which are available to be loaded by resources in key pairs, and wherein each key is mapped to a single loading resource.

Referring now generally to the Figures, and particularly to FIG. 8A, FIG. 8A is a block diagram of a key list 20, wherein the key list 20 contains keys KEY.001-KEY.N which are available for loading to resources 0001-N in key pairs 24, and wherein each key KEY.001-KEY.N is mapped to a single loading of a resource 0001-N. Each key KEY.001-KEY.N within the key list 20 comprises a key identifier KEY.ID.001-KEY.ID.N, a record identifier RECID.001-RECID.N, and an "available" flag FLAG.AVAIL.001-FLAG.AVAIL.N, indicating that the key is not yet committed to a data load process.

Figure 8B:
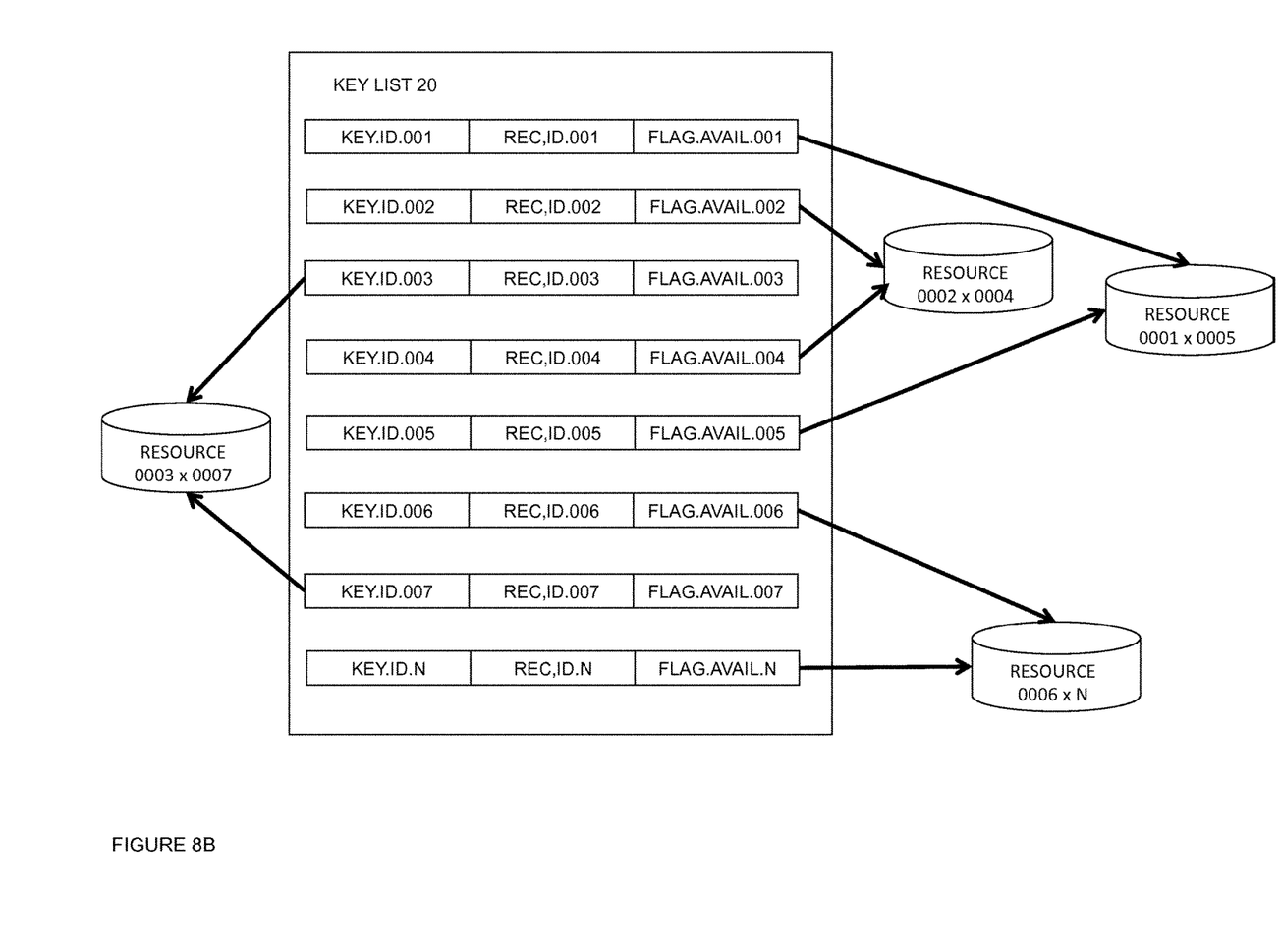
FIG. 8B is a block diagram of a key list, wherein the key list contains keys which are available to be loaded by resources in key pairs, and wherein a plurality of available keys are mapped to a single loading resource.

Referring now generally to the Figures, and particularly to FIG. 8B, FIG. 8B is a block diagram of the key list 20, wherein the key list 20 contains keys KEY.001-KEY.N which are available for loading to resources 0001-N in key pairs 24, and wherein a plurality of keys KEY.001-KEY.N are mapped to each available loading of one or more resources 0001-N. Such an occurrence may be necessary when the physical or software restraints of a computing system create a situation in which insufficient loading of resources 0001-N are available for the necessary data load process.

Figure 9:
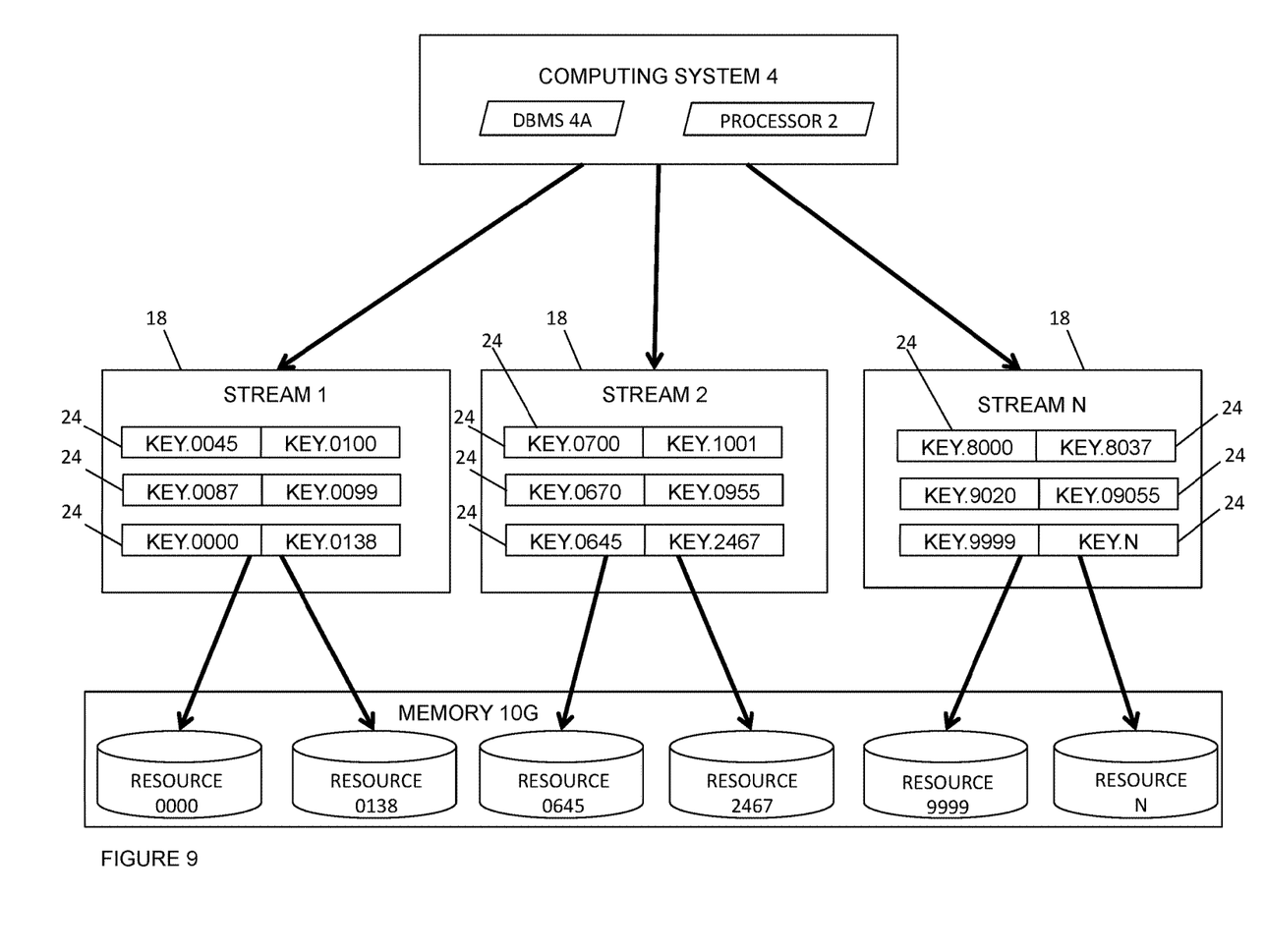
FIG. 9 is a networked block diagram of the above-described processes.

Referring now generally to the Figures, and particularly to FIG. 9, FIG. 9 is a block diagram of a networked process of the invention. The Figure shows the computing system 4, having a database management system therein, and the processor 2, which enables the execution of the steps the invented process as described in FIG. 1 through FIG. 3. The Figure further shows a plurality of data load streams 6, each data load stream 6 containing a plurality of key pairs 24, wherein all but one of key pairs 24 of each data load stream 6 is queued for access. The key pairs 24 at the "front" of a data load stream 6 each correspond to a download resource 22, contained within a database 10, such that there is optimally no delay in the load and/or access of any particular key.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. A method comprising:
    a computer processor ("processor") selecting a first key and a second key, wherein each record of a plurality of records of a database is associated with both the first key and the second key;
    the processor sorting the plurality of records by the first key as the major key and by the second key as the minor key to generate a first candidate file;
    the processor sorting a plurality of records by the second key as the major key and the first key as the minor key to generate a second candidate file;
    determining which candidate file exhibits the larger number of groups;
    selecting the candidate file ("selected file") that has the larger number of groups;

loading the selected file into a receiving database of a database management system ("DBMS"), the DBMS adapted to perform searches of the selected file after receipt, wherein the receiving database is a graph database;

identifying a first plurality of unique key pairs of a first output file and a second plurality of unique key pairs of a second output file, wherein each record is associated with a unique key pair; and uploading each record of the second output file associated with a second key pair of the second plurality of unique key pairs in parallel with the uploading of the first output file to the DBMS, wherein records of different output files that have any key in common are not uploaded in parallel, and a list of all key pairs of each output file is generated, and no records of different output files associated having any key in common are uploaded in parallel, and no keys are found in more than one plurality of unique key pairs that are loaded in parallel.

2. The method of claim 1, wherein the database is a distributed database.

3. The method of claim 1, wherein the database is a relational database.

4. The method of claim 1, wherein the database is an object-oriented database.

5. The method of claim 1, wherein the database is a graph database.

6. The method of claim 1, wherein the database is a distributed database.

7. The method of claim 5, wherein the database is a distributed database.

8. The method of claim 7, further comprising identifying a first plurality of unique key pairs of a first output file and a second plurality of unique key pairs of a second output file, wherein each record is associated with a unique key pair.

9. The method of claim 7, further comprising:
determining a fixed number P of output files to be generated;
determining the number of groups N of the selected file;
assigning equivalent numbers of groups to each of P output files; and
uploading the P output files in parallel to the DBMS.

10. The method of claim 9, further comprising: identifying a separate plurality of unique key pairs for each of the P output files, wherein each record is associated with a unique key pair.

11. The method of claim 9, further comprising uploading in parallel each record of the P output files in conformance with a sequence of key pairs of the output file containing each record.

12. The method of claim 1, further comprising:
splitting the candidate file into at least two output files, wherein all groups are included in only one output file in an undivided state; and
loading at least two output files in parallel to the DBMS.

13. The method of claim 12, further comprising uploading each record of the first output file associated with a first key pair of the first plurality of unique key pairs to the DBMS.

14. The method of claim 1, further comprising:
determining a fixed number P of output files to be generated;
determining the number of groups N of the selected file;
assigning equivalent numbers of groups to each of P output files; and
uploading the P output files in parallel to the DBMS.

15. The method of claim 14, further comprising: identifying a separate plurality of unique key pairs for each of the P output files, wherein each record is associated with a unique key pair.

16. The method of claim 15, further comprising uploading in parallel each record of the P output files in conformance with a sequence of key pairs of the output file containing each record.

17. The method of claim 15, wherein the database is a distributed database.

18. The method of claim 15, wherein no key in a key pair of the separate plurality of unique key pairs for each of the P output files is found in more than one of the P output files.

19. The method of claim 15, wherein records of different output files having a same key are not uploaded in parallel.

20. The method of claim 15, wherein no key in a key pair is found in more than one plurality of unique key pairs.

21. The method of claim 15, wherein a list of all key pairs of every output file is generated, and no two output files simultaneously upload records having a same key in a key pair.

22. A system comprising:
a computer processor ("processor") bi-directionally communicatively coupled with a memory, the processor adapted to select a first key and a second key from the memory of a plurality of records stored in the memory, wherein each record of the plurality of records of a graph database is associated with both the first key and the second key;
means to sort the plurality of records by the first key as the major key and by the second key as the minor key to generate a first candidate file;
means to sort the plurality of records by the second key as the major key and the first key as the minor key to generate a second candidate file;
means to determine which candidate file exhibits the larger number of groups
means to select the candidate file ("selected file") that has the larger number of groups; and
means to load the selected file into a receiving database of a database management system ("DBMS"), wherein the receiving database is a graph database and the DBMS is adapted to perform the following actions:
identify a first plurality of unique key pairs of a first output file and a second plurality of unique key pairs of a second output file, wherein each record is associated with a unique key pair; and
upload each record of the second output file associated with a second key pair of the second plurality of unique key pairs in parallel with uploading of the first output file to the DBMS, wherein records of different output files and having any key in common are not uploaded in parallel;
generate and a list of all key pairs of each output file, wherein no records of different output files associating any keys in common are uploaded in parallel, and no keys are found in more than one plurality of unique key pairs that are loaded in parallel.

* * * * *